US012785979B2

(12) United States Patent
Gawde

(10) Patent No.: US 12,785,979 B2
(45) Date of Patent: Nov. 3, 2026

(54) SYSTEM AND METHOD TO VALIDATE DECRYPTED DATA

(71) Applicant: Bank of America Corporation, Charlotte, NC (US)

(72) Inventor: Meeraj Mahendra Gawde, Navi Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 134 days.

(21) Appl. No.: 18/429,007

(22) Filed: Jan. 31, 2024

(65) Prior Publication Data

US 2025/0247243 A1 Jul. 31, 2025

(51) Int. Cl.
*H04L 9/00* (2022.01)
*H04L 9/32* (2006.01)

(52) U.S. Cl.
CPC .................................. *H04L 9/3236* (2013.01)

(58) Field of Classification Search
CPC ..................................................... H04L 9/3236
See application file for complete search history.

(56) References Cited

U.S. PATENT DOCUMENTS

| | | | |
|---|---|---|---|
| 7,570,828 | B2 | 8/2009 | Rasmussen et al. |
| 8,000,467 | B2 | 8/2011 | Elbaz et al. |
| 8,639,915 | B2 | 1/2014 | Graunke |
| 8,745,408 | B2 | 6/2014 | Mangard |
| 8,868,925 | B2 | 10/2014 | Wyatt et al. |
| 8,909,932 | B2 | 12/2014 | Buer et al. |
| 9,319,389 | B2 | 4/2016 | Kato et al. |
| 9,325,496 | B2 | 4/2016 | Oshida et al. |
| 10,025,912 | B2 | 7/2018 | Kato |
| 10,700,857 | B2 | 6/2020 | Hunacek |
| 11,637,835 | B2 | 4/2023 | Liem et al. |
| 2008/0072068 | A1 | 3/2008 | Wang et al. |
| 2010/0027790 | A1 | 2/2010 | Vembu et al. |
| 2012/0292391 | A1 | 11/2012 | Abd Alla et al. |

(Continued)

OTHER PUBLICATIONS

Jens Rasmusen et al., Generating, Storing, and Displaying Graphics Using Sub-Pixel Bitmaps, U.S. Appl. No. 11/687,168, filed Mar. 16, 2007.

(Continued)

*Primary Examiner* — Kevin Ayala

(57) ABSTRACT

An apparatus comprises a memory communicatively coupled to a processor. The processor is configured to obtain a combined sender hash from a decrypted combined sender hash upon executing the one or more machine learning algorithms in accordance with the one or more machine learning models and obtain a combined receiver hash from a decrypted shareable data upon executing the one or more machine learning algorithms in accordance with the one or more machine learning models. Further, the processor is configured to compare the combined sender hash to the combined receiver hash, determine whether the combined sender hash matches the combined receiver hash, determine that the shareable data is authentic in response to determining that the combined sender hash matches the combined receiver hash, generate a report indicating that the shareable data is authentic, and transmit the report to a sender of the combined sender hash.

14 Claims, 4 Drawing Sheets

(56) References Cited

U.S. PATENT DOCUMENTS

| | | | |
|---|---|---|---|
| 2013/0084003 | A1 | 4/2013 | Crandall et al. |
| 2014/0140504 | A1 | 5/2014 | Karroumi et al. |
| 2015/0186679 | A1 | 7/2015 | Goto et al. |
| 2019/0286833 | A1* | 9/2019 | Takumi ................. H04L 9/3236 |
| 2019/0287103 | A1 | 9/2019 | Mace |
| 2023/0370274 | A1* | 11/2023 | Chen ..................... H04L 9/0825 |

OTHER PUBLICATIONS

Clifford Liem et al., System and Method for Context-Sensitive Access Control, U.S. Appl. No. 16/904,009, filed Jun. 17, 2020.

Meeraj Mahendra Gawde et al., Improvised Model for Blockchain in Distributed Cloud Environment, Article, Sep. 29, 2022, vol. 13547.

Meeraj Mahendra Gawde, System and method to dynamically encrypt data, U.S. Appl. No. 18/428,894, filed Jan. 31, 2024, pp. 1-43.

Meeraj Mahendra Gawde, System and method to dynamically decrypt data, U.S. Appl. No. 18/428,962, filed Jan. 31, 2024, pp. 1-36.

* cited by examiner

SYSTEM AND METHOD TO VALIDATE DECRYPTED DATA

TECHNICAL FIELD

The present disclosure relates generally to one or more verification operations, and more specifically to a system and method to validate decrypted data.

BACKGROUND

Data exchanged between a transmitting endpoint and a receiving endpoint may be intercepted and/or manipulated by bad actors in a communication network. The bad actors may modify, steal, and corrupt the data to affect operations at the receiving endpoint. The changes to the data may compromise communication operations and/or security operations at the receiving endpoint. Further, changes to the data may be part of information attacks (e.g., cyber-attacks) configured to cause large-scale losses and/or exposure of information of an organization associated with the receiving endpoint.

SUMMARY OF THE DISCLOSURE

In one or more embodiments, a system and method are configured to dynamically encrypt, decrypt, and/or verify data exchanged between two endpoints in a communication system. The two endpoints may comprise a transmitting endpoint and a receiving endpoint configured to exchange data directly with one another or through one or more additional nodes in a network. The system and method may be configured to enable encrypted data to be exchanged between the two endpoints. The two endpoints may be configured to train one or more machine learning (ML) models using multiple public keys, semi-private keys, and private keys to encrypt and/or decrypt data exchanged. At the transmitting endpoint, one or more encrypting operations comprise calculating a hash value of data to be exchanged, scrambling the data to be exchanged based on one or more modifications provided by the ML model, and generate a hash value of a scrambled version of the data. Then, the two hash values are combined into a first hash combination and super imposed in the data. At the receiving endpoint, one or more decrypting operations comprise using the ML model to separate the data from the first hash combination and unscramble the scrambled version of the data. At this point, the receiving endpoint is configured to generate a hash value of the scrambled version of the data, a hash value of the unscrambled version of the data, and a second hash combination of the two hash values. As part of one or more verification operations, the first hash combination and the second hash combination are compared. If both hash combinations are the same, then the data exchanged is determined to be untampered by bad actors (e.g., received by a trusted device and/or authentic).

In one or more embodiments, the system and method described herein are integrated into a practical application of dynamically encrypting, decrypting, and verifying data exchanged between two endpoints. The system and method may be configured to secure data exchanges between the two endpoints. In particular, as data is dynamically encrypted, the system and method are configured to provide a constantly-changing encryption process in which a machine learning algorithm utilizes keys to encrypt data differently each time an encryption operation is performed. Further, as data is dynamically decrypted, the system and method are configured to provide a constantly-changing decryption process that matches the encryption process. Once the data is decrypted, the system and method verify that the information encrypted by the transmitting endpoint is the same information decrypted by the receiving endpoint. The verification operations enable the receiving endpoint to confirm that the data is authentic (e.g., originated from a trusted source and/or that the data is authentic).

In one or more embodiments, the system and method are directed to improvements in computer systems. Specifically, the system and method reduce processor and memory usage in devices by dynamically modifying encryption/decryption operations in accordance with an ML model. The ML model enables for changes to be made in encryption operations in response to immediate modifications to keys provided by a receiver. In this regard, the system and method may continuously and/or periodically modify encryption/decryption operations over time. Further, the system and the method prevent data in systems from being compromised if the data is ever intercepted and/or modified by a bad actor. In particular, the receiving endpoint may determine whenever received data is compromised because the verification operations would indicate that the data received is different from the data transmitted by the transmitting endpoint.

In one or more embodiments, the system and the method may be performed by an apparatus, such as the server. Further, the system may be a data exchange system, that comprises the apparatus. In addition, the system and the method may be performed as part of a process performed by the apparatus. As a non-limiting example, the apparatus may comprise a memory and a processor communicatively coupled to one another. The memory may be configured to store one or more machine learning algorithms associated with decrypting data in accordance with one or more machine learning models. The processor is configured to obtain a combined sender hash from a decrypted combined sender hash upon executing the one or more machine learning algorithms in accordance with the one or more machine learning models and obtain a combined receiver hash from a decrypted shareable data upon executing the one or more machine learning algorithms in accordance with the one or more machine learning models. The combined sender hash indicating a first combination of a first hash corresponding to shareable data and a second hash corresponding to an encrypted version of the shareable data at a sender. The combined receiver hash indicating a second combination of a third hash corresponding to the shareable data and a fourth hash corresponding to the encrypted version of the shareable data at a receiver. Further, the processor is configured to compare the combined sender hash to the combined receiver hash, determine whether the combined sender hash matches the combined receiver hash, determine that the shareable data is authentic in response to determining that the combined sender hash matches the combined receiver hash, generate a report indicating that the shareable data is authentic, and transmit the report to a sender of the combined sender hash.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
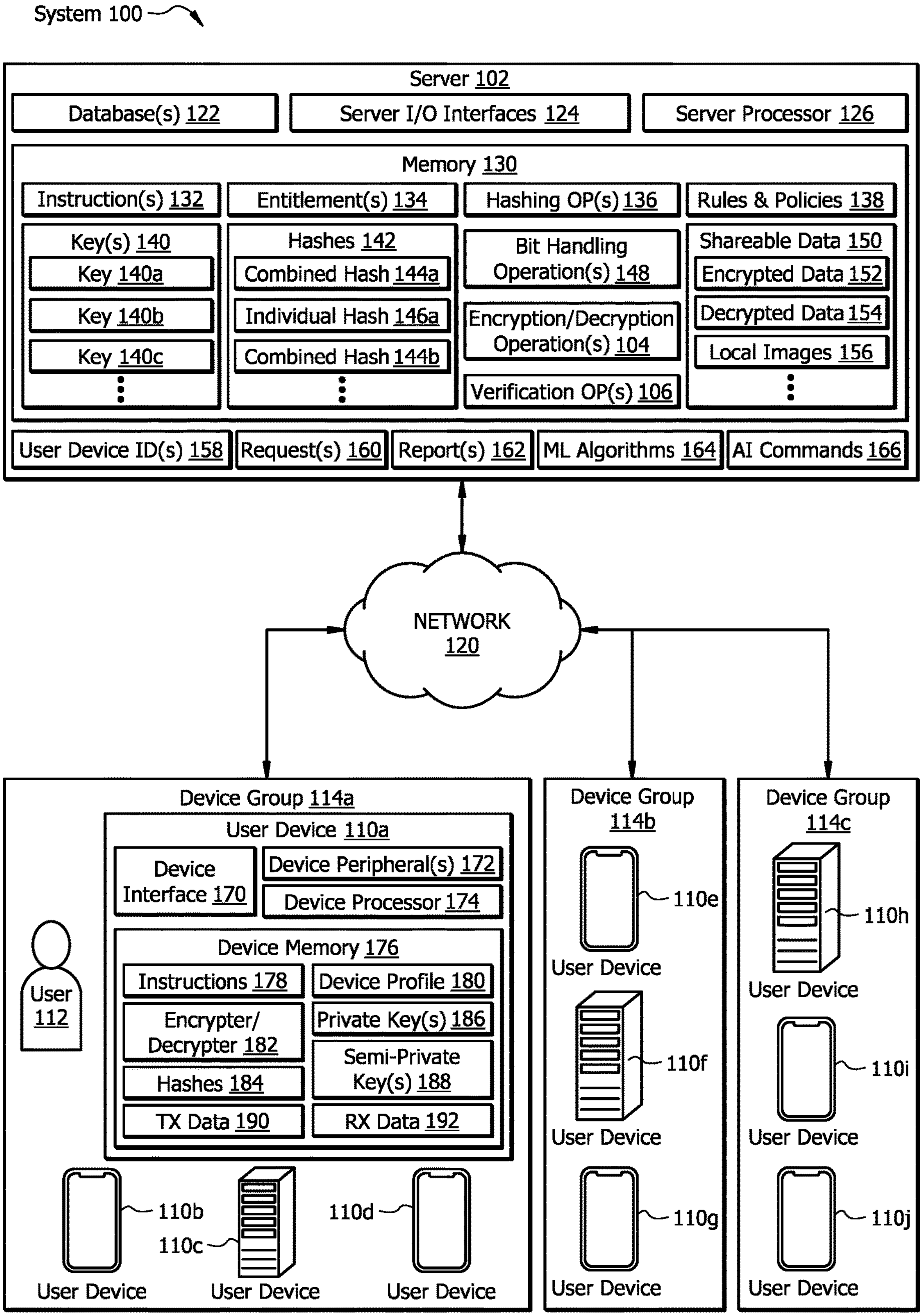
FIG. 1 illustrates a system in accordance with one or more embodiments.
Figure 2:
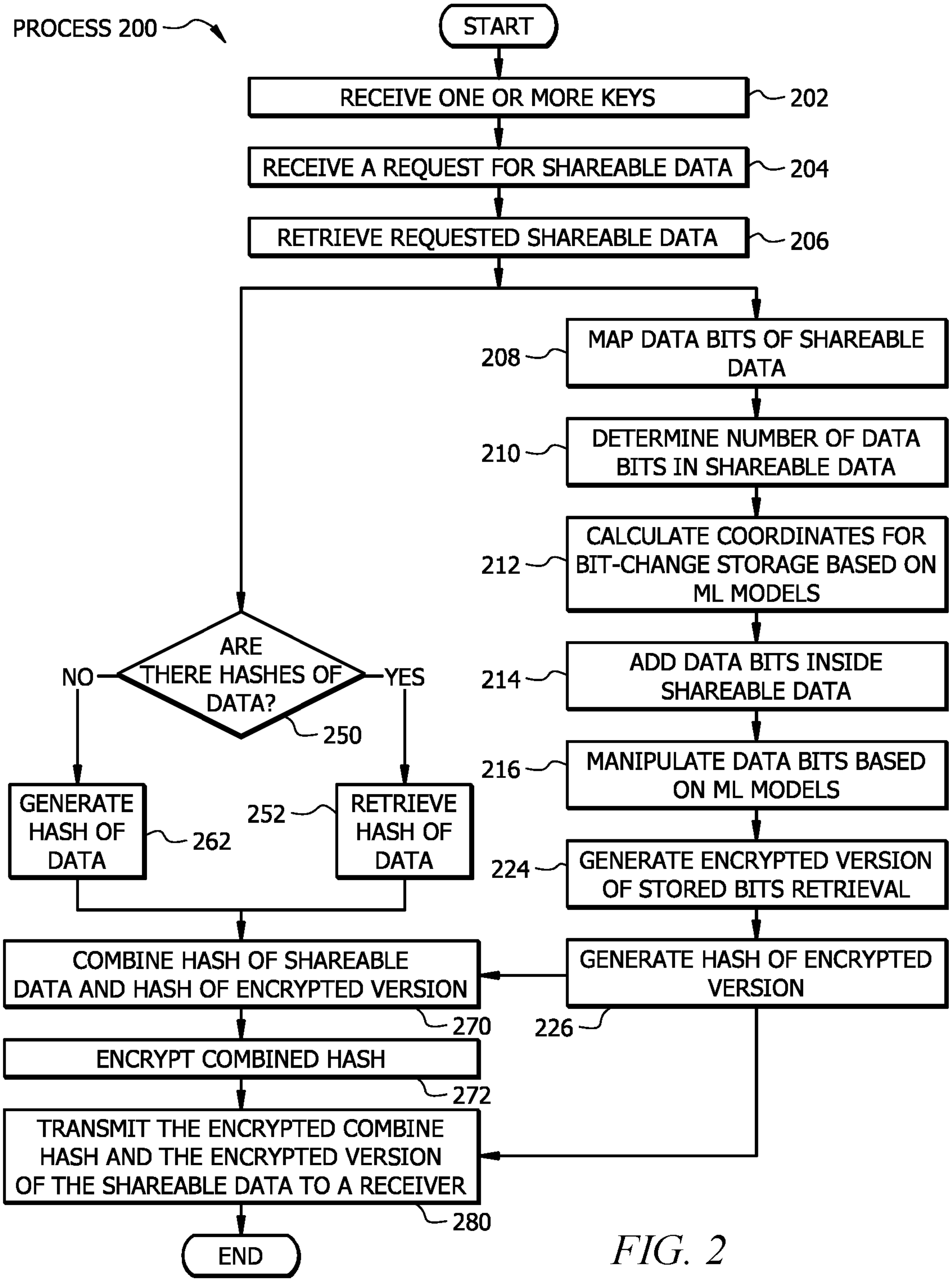
FIG. 2 illustrates an example flowchart of a method to dynamically encrypt data in accordance with one or more embodiments.
Figure 3:
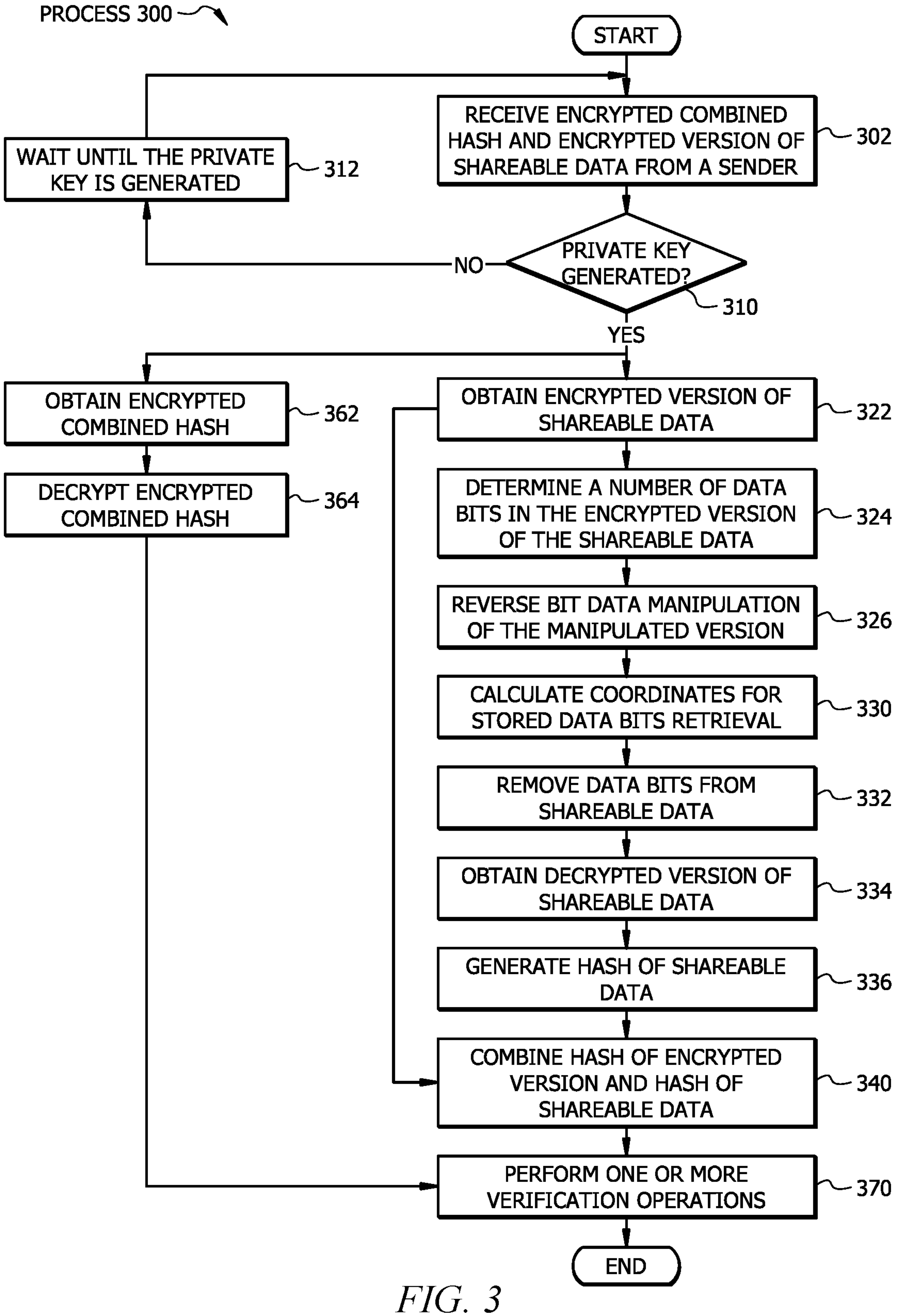
FIG. 3 illustrates an example flowchart of a method to dynamically decrypt data in accordance with one or more embodiments.
Figure 4:
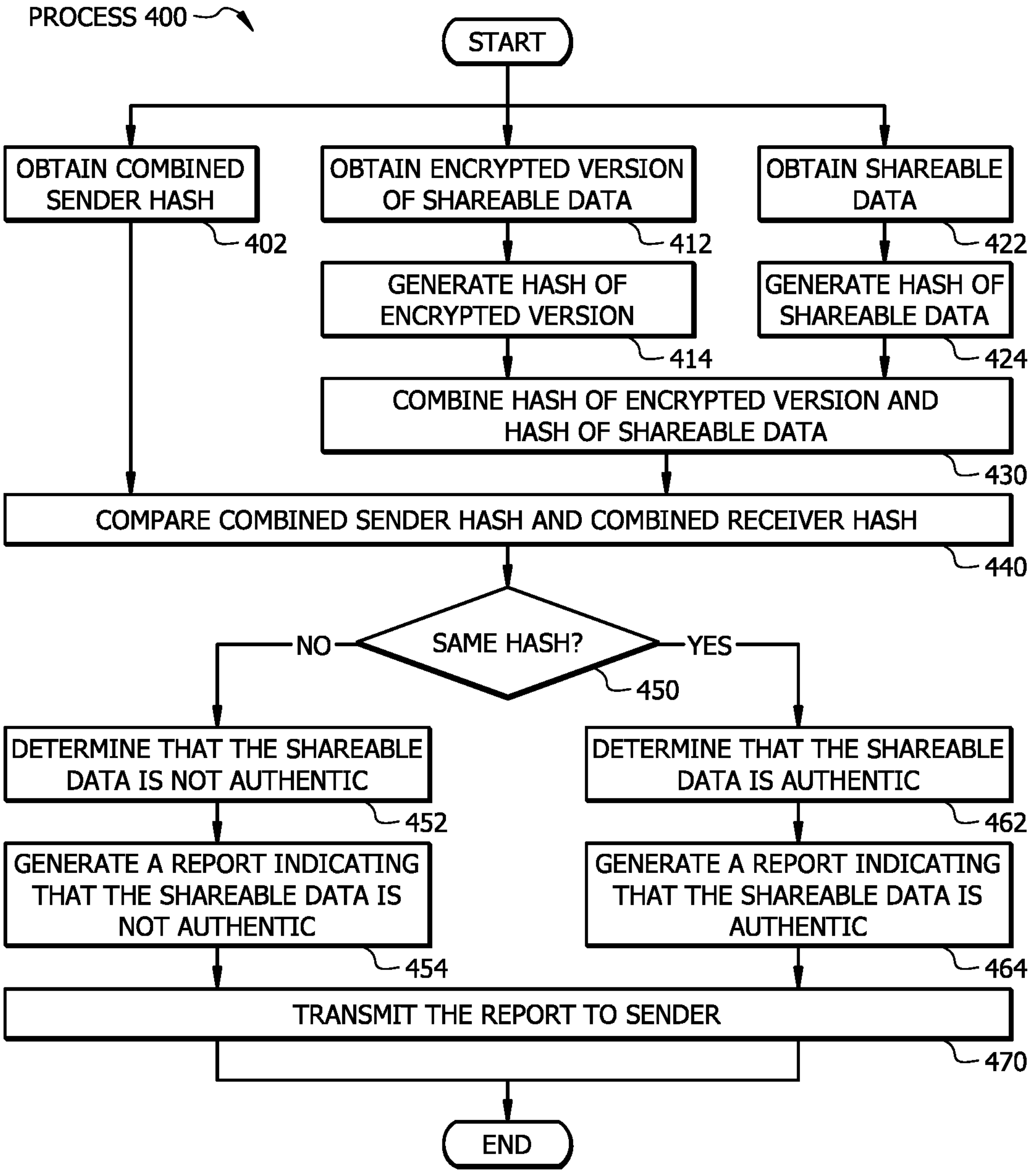
FIG. 4 illustrates an example flowchart of a method to validate decrypted data in accordance with one or more embodiments.

As described above, this disclosure provides various systems configured to dynamically encrypt, decrypt, and/or verify data exchanged between two endpoints in a communication system. FIG. 1 illustrates a system 100 in which a server 102 performs one or more encryption/decryption operations 104 and/or one or more verification operations 106. FIG. 2 illustrates a process 200 performed by the system 100 of FIG. 1 to dynamically encrypt data. FIG. 3 illustrates a process 300 performed by the system 100 of FIG. 1 to dynamically decrypt data. FIG. 4 illustrates a process 400 performed by the system 100 of FIG. 1 to validate decrypted data.

System Overview

FIG. 1 illustrates an example system 100, in accordance with one or more embodiments. The system 100 may comprise a server 102 configured to dynamically perform one or more encryption/decryption operations 104 an/or one or more verification operations 106. In the system 100, the server 102 is communicatively coupled to a user device 110*a*, a user device 110*b*, a user device 110*c*, a user device 110*d*, a user device 110*e*, a user device 110*f*, a user device 110*g*, a user device 110*h*, a user device 110*i*, and a user device 110*j* (collectively, user devices 110). In the example of FIG. 1, while a user 112 is shown associated with the user device 110*a*, one or more additional users may be associated with the user device 110*a*. Further, one or more user devices 110 may be associated with the user 112. In some embodiments, the system comprises a device group 114*a*, a user group 114*b*, and a device group 114*c* (collectively, device groups 114). The server 102 may be communicatively coupled to the device groups 114 via a network 120. In FIG. 1, the device group 114*a* comprises the user device 110*a*, the user device 110*b*, the user device 110*c*, and the user device 110*d*, the device group 114*b* comprises the user device 110*e*, the user device 110*f*, and the user device 110*g*, and the device group 114*c* comprises the user device 110*h*, the user device 110*i*, and the user device 110*j*.

In one or more embodiments, the server 102 may comprise one or more databases 122, one or more server input (I)/output (O) interfaces 124, one or more server processors 126, and at least one memory 130 communicatively coupled to one another. In some embodiments, the memory 130 may comprise one or more instructions 132, one or more entitlements 134, one or more hashing operations 136, one or more rules and policies 138, one or more keys 140 comprising key 140*a*, key 140*b*, and key 140*c* among others, one or more hashes 142 comprising a combined hash 144*a*, an individual hash 146*a*, and a combined hash 144*b* among others, one or more bit handling operations 148, the one or more encryption/decryption operations 104, the one or more verification operations 106, shareable data comprising encrypted data 152, decrypted data 154, and local images 156 among others, one or more user device identifiers (IDs), one or more requests m160, one or more reports 162, one or more machine learning (ML) algorithms 164, and one or more artificial intelligence (AI) commands.

Referring to the user device 110*a* a non-limiting example, the user device 110*a* may comprise at least one device interface 170, one or more device peripherals 172, at least one device processor 174, and at least one device memory 176 comprising instructions 178, at least one device profile 180, an encrypter/decrypter 182, one or more hashes 184, one or more private keys 186, one or more semi-private keys 188, transmitted data 190, and received data 190.

System Components

Server

The server 102 is generally any device or apparatus that is configured to process data and communicate with computing devices (e.g., the user devices 110), additional databases 122, systems, and the like, via the one or more server I/O interfaces 124 (i.e., a user interface or a network interface). The server 102 may comprise the server processor 126 that is generally configured to oversee operations of the processing engine. The operations of the processing engine are described further below in conjunction with the system 100 described in FIG. 1, the process 200 described in FIG. 2, the process 300 described in FIG. 3, and the process 400 described in FIG. 4.

The server 102 comprises multiple databases 122 configured to provide one or more memory resources to the server 102 and/or the user devices 110. The server 102 comprises the server processor 126 communicatively coupled with the databases 122, the server I/O interfaces 124, and the memory 130. The server 102 may be configured as shown, or in any other configuration. In one or more embodiments, the databases 122 are configured to store data that enables the server 102 to configure, manage and coordinate one or more middleware systems. In some embodiments, the databases 122 store data used by the server 102 to act as a halfway point in between one or more services and other tools or databases.

In one or more embodiments, the server I/O interfaces 124 may be configured to enable wired and/or wireless communications. The server I/O interfaces 124 may be configured to communicate data between the server 102 and other user devices (i.e., the user devices 110), network devices (i.e., routers in the network 120), systems, or domain(s) via the network 120. For example, the server I/O interfaces 124 may comprise a WI-FI interface, a LAN interface, a WAN interface, a modem, a switch, or a router. The server processor 126 may be configured to send and receive data using the server I/O interfaces 124. The server I/O interfaces 124 may be configured to use any suitable type of communication protocol. In some embodiments, the server I/O interfaces 124 may be an admin console comprising a web browser-based or graphical user interface used to manage a middleware server domain via the server 102. A middleware server domain may be a logically related group of middleware server resources that managed as a unit. A middleware server domain may comprise the server 102 and one or more managed servers (not shown). The managed servers may be standalone devices and/or collected devices in a server cluster. The server cluster may be a group of managed servers that work together to provide scalability and higher availability for the services. In this regard, the services are developed and deployed as part of at least one domain. In other embodiments, one instance of the managed servers in the middleware server domain may be configured as the server 102. The server 102 provides a central point for managing and configure the managed servers and any of the one or more services.

The server processor 126 comprises one or more processors communicatively coupled to the memory 130. The server processor 126 may be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 126 may be a programmable logic device, a microcontroller, a microprocessor, or any suitable combination of the preceding. The one or more server processor 126 are configured to process data and may be implemented in hardware or software executed by hardware. For example, the server processor 126 may be 8-bit, 16-bit, 32-bit, 64-bit or of any other suitable architecture. The server processor 126 may include an arithmetic logic unit (ALU) for performing arithmetic and logic operations, processor registers that supply operands to the ALU and store the results of ALU operations, and a control unit that fetches the instructions 132 from the memory 130 and executes them by directing the coordinated operations of the ALU, registers and other components. In this regard, the one or more server processor 126 are configured to execute various instructions 132. For example, the one or more server processor 126 are configured to execute the instructions 132 to implement the functions disclosed herein, such as some or all of those described with respect to FIGS. 1-4. In some embodiments, the functions described herein are implemented using logic units, FPGAs, ASICs, DSPs, or any other suitable hardware or electronic circuitry.

In one or more embodiments, the server I/O interfaces 124 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The server I/O interfaces 124 may be configured to support any suitable type of communication protocol as would be appreciated by one of ordinary skill in the art.

The memory 130 may be volatile or non-volatile and may comprise a read-only memory (ROM), random-access memory (RAM), ternary content-addressable memory (TCAM), dynamic random-access memory (DRAM), and static random-access memory (SRAM). The memory 130 may be implemented using one or more disks, tape drives, solid-state drives, and/or the like. The memory 130 is operable to store the instructions 132, the one or more entitlements 134, the hashing operations 136, the rules and policies 138, the one or more keys 140, the hashes 142 comprising one or more combined hashes 144 and/or one or more individual hashes 146, the one or more bit handling operations 148, the one or more encryption/decryption operations 104, the one or more verification operation 106, the shareable data 150 comprising encrypted data 152, decrypted data 154, and/or local images 156, the one or more user device IDs 158, the one or more requests 160, the one or more reports 162, the ML algorithms 164, the AI commands 166, and/or any other data or instructions. The instructions 132 may comprise any suitable set of instructions, logic, rules, or code operable to execute the server processor 126.

The hashing operations 136 may be one or more commands configured to transform any given key 140 or a string of characters into another one or more hashes 142. The keys 140 may be a fixed-length value or variable alphanumeric data string that represents one or more portions of the shareable data 150. The hashing operations 136 may be operations configured to generate new values according to one or more hashing instructions and/or one or more hashing algorithms. The hashing operations 136 may be configured to map object data to a representative integer value. In some embodiments, the hashing operations 136 may be configured to operate during one or more encryption/decryption operations 104 configured to encrypt and decrypt digital signatures used to authenticate message senders and receivers. In this regard, the hashing operations 136 is configured to transform the digital signatures before both the hash 142 (e.g., hashed value or a message digest) and the signature are sent in separate transmissions to the receiver. Upon receipt, the hashing operations 136 may be configured to derive the hash 142 from the signature, which is then compared with the transmitted hash 142 to ensure both are the same. In some embodiments, the hashing operations 136 may comprise one-way hashing operations. In these operations, the hashing operations 136 may be configured to index original values or keys 140 and enable access to data associated with a specific value or key 140 that is retrieved.

The rules and policies 138 may be security configuration commands or regulatory operations predefined by an organization or one or more users 112. In one or more embodiments, the rules and policies 138 may be dynamically defined by the one or more users 112. The rules and policies 138 may be prioritization rules configured to instruct one or more user devices 110 to perform one or more operations in the system 100 in a specific request. The one or more rules and policies 138 may be predetermined or dynamically assigned by a corresponding user 112 or an organization associated with the user 112.

The one or more keys 140 may be information comprising one or more secret parameters, mapping configuration, and/or secure data. The one or more keys 140 may be configured to train one or more models in the ML algorithms 164 and/or to be at least partially controlled by the AI commands 166. In some embodiments, the server 102 may be configured to create one or more of the keys 140 based on the one or more secret parameters, the mapping configuration, and/or the secure data. The keys 140 may be used in one or more of the hashing operations 136, the one or more bit handling operations 148, the one or more encryption/decryption operations, and/or the one or more verification operations 106. The keys 140 may be information parameters and/or information elements configured to trigger specific operations in a containerized environment. The keys 140 may be public keys shared, semi-public keys, and/or semi-public keys with one or more devices communicatively coupled to the network 120.

The one or more hashes 142 may be information representing hashed data. In particular, the hashes 142 may associate one or more bits and/or a string of data in accordance with one or more hashing operations 136. The hashes 142 may be created and/or updated dynamically and/or periodically over time by commands received by the server 102 from the one or more server I/O interfaces 124 and/or retrieved from the one or more databases 122. The hashes 142 may be results of one or more additional operations corresponding to any of the user devices 110. The one or more hashes 142 may comprise one or more individual hashes 146 (e.g., the individual hash 146*a*) and/or one or more combined hashes 144 (e.g., the combined hash 144*a* and the combined hash 144*b*). The individual hashes 146 may be hashes 142 representative one data object. The combined hashes 144 may be hashes 144 representative of two or more data objects.

The bit handling operations 148 may be one or more operations used in data compression operations comprising data that is converted from one representation with a larger number of bits to another representation with a lower number of bits. In one or more embodiments, the bit handling operations 148 may be configured to decode or compress files by extracting data at a bit level. In some embodiments, the bit handling operations 148 may be configured to algorithmically manipulate bits or other pieces of data.

The one or more encryption/decryption operations 104 may be operations performed by the server processor 126 operating as a hardware accelerator, a processing accelerator, signal processing circuitry (e.g., including filters, mixers, oscillators, amplifiers, and the like), or digital processing circuitry (e.g., for digital modulation as well as other digital processing). In some embodiments, the encryption/decryption operations 104 may be performed by processing hardware configured to configured to allocate power, processing, and memory resources during encryption/decryption of communication information. In some embodiments, the encryption/decryption operations 104 comprises transforming data from a first format to another format. The encryption/decryption operations 104 may be configured perform one or more encryption operations in based on information obtained from one or more of the keys 140. The one or more verification operations 106 may be configured to provide verification information between the server 102 and one of the user devices 110. The verification operations 106 may be operations configured to compare hashes 142 to one another. The verification operations 106 may be performed by the server 102 and/or one of the user devices 110.

The shareable data 150 may comprise information associated with one or more services in the system 100. The shareable data 150 may be encrypted data 152, decrypted data 154, sound data, and/or local images 156 among other types of data. The shareable data 150 may be stored in the memory 130 to be accessed by an application and/or service at any given moment in time. The shareable data 150 may be information associated with memory resources and/or processing resources of the user devices 110. The shareable data 150 may be information indexing one or more testing capabilities of one or more user devices 110. In some embodiments, the shareable data 150 may indicate one or more encryption/decryption characteristics at a given user device 110. The shareable data 150 may be information configured to indicate whether a user device 110 is enabled to perform one or more specific information.

In one or more embodiments, the user device IDs 158 may comprise multiple profiles for the user devices 110. Each user device ID 158 may be associate one or more device profiles 180 with one or more entitlements 134. The entitlements 134 may indicate that a given user device 110 is allowed to access one or more network resources in accordance with the one or more rules and policies 138. The entitlements 134 may indicate that a given user device 110 is allowed to perform one or more operations in the system 100 (e.g., provide a specific application data access to one of the user devices 110). To secure or protect operations of the user devices 110 from bad actors, the entitlements 134 may be assigned to a given device profile 180 in accordance with updated security information, which may provide guidance parameters to the use of the entitlements 134 based at least upon corresponding rules and policies 138.

In one or more embodiments, the ML algorithms 164 may be executed by the server processor 126 to evaluate the requests 160. Further, the ML algorithms 164 may be configured to interpret and transform the instructions 132 and/or the shareable data 150 into structured data sets and subsequently stored as files or tables. The ML algorithms 164 may cleanse, normalize raw data, and derive intermediate data to generate uniform data in terms of encoding, format, and data types. The ML algorithms 164 may be executed to run user queries and advanced analytical tools on the structured data based on one or more ML models. The ML algorithms 164 may be configured to generate the one or more AI commands 166 based on one or more results of the operations. The AI commands 166 may be parameters that proactively modify the instructions 132 and/or the shareable data 150. The AI commands 166 may be combined with the existing instructions 132 to dynamically modify access to one or more portions of the shareable data 150.

The requests 160 and the reports 162 may be information messages exchanged between one or more user devices 110 and the server 102. In one or more embodiments, the requests 160 may be messages configured to trigger one or more operations in the server 102. The requests 160 may comprise information configured to validate one or more of the device profiles 180 against one or more of the user device IDs 158. In one or more embodiments, the reports 162 may be messages configured to alert one or more devices in the system 100. The reports 162 may comprise information configured to indicate validation of one or more of the device profiles 180 against one or more of the user device IDs 158.

Network

The network 120 facilitates communication between and amongst the various devices of the system 100. The network 120 may be any suitable network operable to facilitate communication between the server 102 and the user devices 110 of the system 100. The network 120 may include any interconnecting system capable of transmitting audio, video, signals, data, data packets, messages, or any combination of the preceding. The network 120 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the devices.

User Device

In one or more embodiments, each of the user devices 110 (e.g., the user devices 110*a*-110*d* in the device group 114*a*, the user devices 110*e*-110*g* in the device group 114*b*, and the user devices 110*h*-110*j* in the device group 114*c*) may be any computing device configured to communicate with other devices, such as the server 102, other user devices 110 in the user device groups 114, databases, and the like in the system 100. Each of the user devices 110 may be configured to perform specific functions described herein and interact with the server 102 and/or any other user devices 110 in the user device groups 114. Examples of the user devices 110 comprise, but are not limited to, a laptop, a computer, a smartphone, a tablet, a smart device, an IoT device, a simulated reality device, an augmented reality device, or any other suitable type of device. The requests 160 may be provided by the user devices 110 via one or more interfaces comprising input displays, voice microphones, or sensors capturing gestures performed by a corresponding user 112.

The user devices 110 may be hardware configured to create, transmit, and/or receive information. The user devices 110 may be configured as a provider node or as worker nodes. The user devices 110 may be configured to receive inputs from a user, process the inputs, and generate data information or command information in response. The data information may include documents or files generated using a graphical user interface (GUI). The command information may include input selections/commands triggered by a user using a peripheral component or one or more server peripherals 172 (i.e., a keyboard) or an integrated input system (i.e., a touchscreen displaying the GUI). The user devices 110 may be communicatively coupled to the server 102 via a network connection (i.e., the server peripherals 172). The user devices 110 may transmit and receive data information, command information, or a combination of both to and from the server 102 via the server interfaces 170. In one or more embodiments, the user devices 110 are configured to exchange data, commands, and signaling with the server 102. In some embodiments, the user devices 110 are configured to receive at least one firewall configuration from the server 102 to implement a firewall (one of the one or more local applications) at one of the user devices 110.

In one or more embodiments, the server interfaces 170 may be any suitable hardware or software (e.g., executed by hardware) to facilitate any suitable type of communication in wireless or wired connections. These connections may comprise, but not be limited to, all or a portion of network connections coupled to additional user devices 110, the server 102, the Internet, an Intranet, a private network, a public network, a peer-to-peer network, the public switched telephone network, a cellular network, a LAN, a MAN, a WAN, and a satellite network. The device interface 170 may be configured to support any suitable type of communication protocol.

In one or more embodiments, the one or more device peripherals 172 may comprise audio devices (e.g., speaker, microphones, and the like), input devices (e.g., keyboard, mouse, and the like), or any suitable electronic component that may provide a modifying or triggering input to the user devices 110. For example, the one or more device peripherals 172 may be speakers configured to release audio signals (e.g., voice signals or commands) during media playback operations. In another example, the one or more device peripherals 172 may be microphones configured to capture audio signals. In one or more embodiments, the one or more device peripherals 172 may be configured to operate continuously, at predetermined time periods or intervals, or on-demand.

The device processor 174 may comprise one or more processors communicatively coupled to and in signal communication with the device interfaces 170, the device peripherals 172, and the device memory 176. The device processor 174 is any electronic circuitry, including, but not limited to, state machines, one or more CPU chips, logic units, cores (e.g., a multi-core processor), FPGAs, ASICs, or DSPs. The device processor 174 may be a programmable logic device, a microcontroller, a microprocessor, or any suitable combination of the preceding. The one or more processors in the device processor 174 are configured to process data and may be implemented in hardware or software executed by hardware. For example, the device processor 174 may be an 8-bit, a 16-bit, a 32-bit, a 64-bit, or any other suitable architecture. The device processor 174 may comprise an ALU to perform arithmetic and logic operations, processor registers that supply operands to the ALU, and store the results of ALU operations, and a control unit that fetches software instructions such as device instructions 178 from the device memory 176 and executes the device instructions 178 by directing the coordinated operations of the ALU, registers, and other components via a device processing engine (not shown). The device processor 174 may be configured to execute various instructions.

The device memory 176 may comprise multiple operation data and one or more local applications associated with the server 102. The operation data may be data configured to enable one or more data processing operations such as those described in relation with the server 102. The operation data may be partially or completely different from those comprised in the memory 130. The local applications may be one or more of the services described in relation with the server 102. In some embodiments, the local applications may be partially or completely different from those comprised in the memory 130.

In one or more embodiments, the encrypter/decrypter 182 are deployable units of computing that are created and managed in a containerized environment. The encrypter/decrypter 182 may be configured as redundancies of one another or as standalone portions of a wireless communication network. The encrypter/decrypter 182 may comprise one or more containers (e.g., one or more container clusters) with shared storage and network resources. The shared storage and network resources may be co-located and co-scheduled. The network resources may be power resources, memory resources, and processing resources that are consumed in attempts to access the services in a given communication system 100. The hashes 184 may be one or more of the hashes described in the server 102. In this regard, the hashes 184 may be one or more combined hashes 144 and/or one or more individual hashes 146. The private keys 186 and the semi-private keys 188 may be one or more of the keys 140 mentioned in reference to the server 102. The private keys 186 and the semi-private keys 188 may be one or more keys 140 share with one or more user devices 110 in one or more device groups 114. The private keys 186 may be one or more private parameters or secrets shared to perform one or more encryption/decryption operations 104 in the server 102. Further, the private keys 186 may be one or more private parameters or secrets shared to perform one or more operations comprising encryption/decryption, transmission data 190 and/or reception data 192 in additional user devices 110. The semi-private keys 188 may be one or more parameters shared to perform one or more encryption/decryption operations 104 in the server 102. Further, the private keys 186 may be one or more parameters shared to perform one or more operations comprising encryption/decryption, transmission data 190 and/or reception data 192 in additional user devices 110.

Operational Flow

In one or more embodiments, the server 102 may be configured to implement the encryption/decryption operations 104 and/or the verification operations 106 to reduce and/or prevent cyber-attacks in the system 100. In this regard, while data is transferred between one or more devices, the server 102 is configured to reduce and/or prevent data loss to bad actors. In some embodiments, the server 102 may be configured to encrypt and/or decrypt the shareable data 150 using one or more ML algorithms 164. The ML algorithms 164 may be configured to modify the hashing operations 136, the bit handling operations 148, the encryption/decryption operations 148, and/or the verification operations 106. The ML algorithms 164 may be configured to be trained using the one or more keys 140. In this regard, the ML algorithms 164 may be configured to take public keys 140 as an input for generating coordinates for confidential data storage. As described above, any of the user devices 110 may be configured to perform one, some, or all of the operations described in reference to the server 102.

In one or more embodiments, during encryption, the server 102 may be configured to perform one or more hashing operations 136 to calculate a first individual hash 146*a* (e.g., hash value) of a shareable data 150 and a second individual hash 146*b* of a version of the shareable data 150 with data bits added during bit handling operations 148. The server 102 may be configured to perform the one or more bit handling operations 148 to add bits to a number of bits in the shareable data 150. Further, the server 102 is configured to combine the first individual hash 146*a* and the second individual hash 146*b* into a combined hash 144*a*. At this stage, the combined hash 144*a* may be superimposed in the version of the shareable data 150 comprising additional bits in accordance with one or more of the encryption/decryption operations 104.

In some embodiments, during decryption, the server 102 may be configured to execute the ML algorithms 164 to perform one or more of the decryption operations at one of the user devices 110 (e.g., at the user device 110*a*) configured to receive the superimposed version of the shareable data 150. In other embodiments, the user device 110*a* may be equipped with the ML algorithms 164 to perform one or more of the operations described in reference to the server 102 without being triggered and/or prompted by the server 102. The ML algorithms 164 may be configured to take one or more private keys 186 as input, for finding the coordinates of data stored separating the version of the shareable data 150 with added bits and the combined hash 144*a* in accordance with one or more of the encryption/decryption operations 104.

During verification, the user device 110*a* may be configured to generate an additional combined hash 144*b* (e.g., hash value) based on an individual hash 146*c* of a decrypted version of the shareable data 150 and an individual hash 146*d* representative of a version of the shareable data with added bits. If the combined hash 144*a* and the combined hash 144*b* are the same, the user device 110 may determine that the encrypted shareable data 150 was received from a trusted device (e.g., the data is authentic). If the combined hash 144*a* and the combined hash 144*b* are not the same, the user device 110 may determine that the encrypted shareable data 150 was received from an untrusted device (e.g., the data is not authentic). In some embodiments, trusted devices may be devices previously verified and/or authenticated to be associated with a common organization. Similarly, untrusted devices may devices that are not previously verified and/or authenticated to be associated with a common organization.

Example Processes

FIGS. 2-4 illustrate examples flowcharts of a process 200, a process 300, and a process 400, respectively. The process 200 may be configured to dynamically encrypt data 150, in accordance with one or more embodiments. The process 300 may be configured to dynamically decrypt data 150, in accordance with one or more embodiments. The process 400 may be configured to validate decrypted data 150, in accordance with one or more embodiments. Modifications, additions, or omissions may be made to the process 200, the process 300, and the process 400. The process 200, the process 300, and the process 400 may comprise more, fewer, or other operations than those shown in FIGS. 2-4, respectively. For example, operations may be performed in parallel or in any suitable order. While at times discussed as the server 102, the user devices 110, or components of any of thereof performing operations described in operations 202-280 in the process 200, operations 302-370 in the process 300, and operations 402-470 in the process 400, any suitable system or components of the system 100 may perform one or more operations of the process 200, the process 300, and/or the process 400. For example, one or more operations of the process 200 may be implemented, at least in part, in the form of instructions 132 of FIG. 1, stored on non-transitory, tangible, machine-readable media (e.g., non-transitory computer readable medium such as the server memory 130 of FIG. 1) that when run by one or more processors (e.g., the server processor 126 of FIG. 1) may cause the one or more processors to perform operations described in operations 202-280.

Process to Dynamically Encrypt Data

FIG. 2 illustrates an example flowchart of a process 200 configured to dynamically encrypt data, in accordance with one or more embodiments. In one or more embodiments, the process 200 is configured to encrypt sensitive data using the ML algorithms 164. The process 200 may be performed by the server 102 or any network component configured to encrypt shareable data 150 into an image by mapping bits of the shareable data 150 into bits of the image based on a public key 140, a private key 140, and a semi-private key 140. Further, the network component encrypts the shareable data further by scrambling the bits of the image using a specific ML model. In some embodiments, the network component determines sensitive information to be sent by a sender and any keys 140 associated with the information. The network component performs bit mapping of images representative of the sensitive data in accordance with the multiple keys. At this stage, the network component executes the ML algorithms 164 in accordance with the specific ML model to scramble bits in the images representative of the shareable data 150 based on one or more public keys 140 associated with a receiver (e.g., one or more of the user devices 110). Then, the scrambled images are transmitted into the network 120 with a destination to the receiver.

The process 200 starts at operation 202, where the server 102 receives one or more keys 140. The one or more keys 140 may comprise a public key 140*a* associated with a first receiver (e.g., one of the user devices 110 such as the user device 110*a*). In some embodiments, the one or more keys 140. At operation 204, the server 102 is configured to receive a request 160 for shareable data 150. The request 160 may be received from one of the user devices 110 communicatively coupled to the receiver. At operation 206, the server 102 is configured to retrieve the requested shareable data 150.

In one or more embodiments, one or more ML algorithms 164 associated with encrypting data in accordance with one or more ML models. Upon executing the one or more ML algorithms 164 in accordance with the one or more machine learning models, the server 102 may be configured to encrypt the shareable data 150 based at least in part upon the one or more keys 140. At operation 208, the server 102 is configured to map data bits of shareable data 150. At operation 210, the server 102 is configured to determine number of data bits in the shareable data 150. At operation 212, the server 102 is configured to calculate coordinates for bit-change storage based on the ML models. The one or more ML algorithms 164 are executed by the server processor 126 in accordance with a ML model that is trained based at least in part upon the public key 140 associated with the receiver. At operation 214, the server 102 is configured to add data bits inside the shareable data 150. At operation 216, the server is configured to manipulate the data bits based on the ML models. At operation 224, the server 102 generates encrypted version of stored bits retrieval. At operation 226, the server 102 generates a hash 142 of the encrypted version of the shareable data 150. Then, the process 200 proceeds to operation 270 and operation 280.

At operation 250, the server 102 is configured to determine whether the memory 130 comprises hashes 142 of the shareable data 150 obtained in operation 242. If the server 102 determines that there are hashes 142 of the shareable data 150 (e.g., YES), the process 200 proceeds to operation 252. At operation 252, the server 102 is configured to generate an individual hash **146*a* of the shareable data 150. If the server 102 determines that there is no individual hash 146*a* of the shareable data 150 (e.g., NO), the process 200 proceeds to operation 262. At operation 262, the server 102 is configured to retrieve the individual hash 146*a* of the shareable data 150**.

At operation 270, the server 102 is configured to combine the individual hash **146*a* of the shareable data 150 and the individual hash 146*b* of the encrypted version of the shareable data 150. At operation 272, the server 102 is configured to encrypt the individual hash 146*a* and the individual hash 146*b* into a combined hash 144. The process 200 may end at operation 280, where the server 102 may be configured to transmit the combined hash 144 encrypted at operation 272 and the version of the shareable data 150 encrypted at operation 224** to a receiver.

Process to Dynamically Decrypt Data

FIG. 3 illustrates an example flowchart of a process 300 to dynamically decrypt data, in accordance with one or more embodiments. In one or more embodiments, the process 300 is configured to decrypt scrambled images representative of sensitive data using one or more ML algorithms 164. The process 300 may be performed by one of the user devices 110 or any network component acting as a receiver configured to decrypt aggregated images into shareable data 150 by reverse manipulating a total number of bits in the aggregated images and descrambling the bits using a specific ML model. Further, the network component may be configured to execute the ML algorithms 164 in accordance with the specific ML model to calculate coordinates for stored bit retrieval based on a private key 140 of the receiver. At this stage, the network component may be configured to retrieve the shareable data 150 from the restored images in plain text based on the calculated coordinates.

The process 300 starts at operation 302, where the user device **110*a* receive encrypted combined hash 144*a* and an encrypted version of shareable data 150 from a sender (e.g., the server 102). In one or more embodiments, the one or more ML algorithms 164 may be associated with decrypting data in accordance with one or more ML models. Further, the one or more keys 140 may comprise a public key 140 associated with the receiver. The encrypted shareable data 150 and the encrypted combined sender hash 144*a* may be received at the receiver from the sender. At operation 304, the user device 110*a* is configured to determine whether private keys 140 are generated. If the user device 110*a* is not configured to determine whether private keys 140 are generated (e.g., NO), the process 300 proceeds to operation 312. At operation 312, the user device 110*a* waits until the private key 140 is generated. If the user device 110*a* is configured to determine whether private keys 140 are generated (e.g., YES), the process 300 proceeds to operation 322 and operation 362**.

At operation 322, the user device **110*a* is configured to obtain encrypted version of the shareable data 150. At operation 324, the user device 110*a* is configured to determine a number of data bits in the encrypted version of the shareable data 150. At operation 326, the user device 110*a* is configured to reverse bit data manipulation of the manipulated version. At operation 330, the user device 110*a* may be configured to calculate coordinates for stored data bits reversal. At operation 332, the user device 110*a* may be configured to remove data bits from shareable data 150. In some embodiments, upon executing the one or more ML algorithms 164 in accordance with the one or more ML models, the user device 110*a* is configured to calculate multiple coordinates configured to change one or more data bits in the encrypted shareable data 150. At operation 334, the user device 110*a* may be configured to obtain decrypted version of shareable data 150. In conjunction with calculating the coordinates configured to change the one or more data bits in the encrypted shareable data 150, the user device 110*a* may be configured to reverse manipulate a total number of data bits in the encrypted shareable data 150. Further, in response to reversing manipulation of the total number of data bits in the encrypted shareable data 150, the user device 110*a* may be configured to remove data bits from inside the encrypted shareable data 150. At operation 336, the user device 110*a* may be configured to generate an individual hash 146*a* of shareable data 150. At operational 340, the user device 110 may be configured to combine the individual hash 146*a* of the encrypted version of the shareable data 150 and an individual hash 146*b* representative of the shareable data 150 into a combined hash 144*a*. The encrypted shareable data 150 and the encrypted combined hash 144*a* may be received from the user device 110*a*** communicatively coupled to the sender.

The process 300 continues at operation 362, where the user device **110*a* obtains the encrypted combined hash 144*a*. At operation 364, the user device 110 may be configured to decrypt the encrypted combined hash 144*a***.

The process 300 may end at operation 370, where the user device **110*a* may be configured to perform one or more verification operations 106. In some embodiments, the user device 110*a* may be configured to perform one or more the verification operations 106 based at least in part upon the combined receiver hash 144*a* and a decrypted combined sender hash 144*b*. The decrypted combined sender hash 144*b* may be a decrypted version of the encrypted combined sender hash 144*a***.

Process to Validate Decrypted Data

FIG. 4 illustrates an example flowchart of a process 400 to validate decrypted data, in accordance with one or more embodiments. In one or more embodiments, the process 400 is configured to verify whether decrypted shareable data 150 is authentic. The process 400 may be performed by the user device **110*a* or any network component configured to decrypt images into data an obtain an individual hash 146*a* of the decrypted images and an individual hash 146*b* of the retrieved data. Further, the network component may be configured to combine the individual hash 146*a* of the decrypted image and the individual hash 146*b* of the retrieved data into a combined hash 144*a* indicative of the received data. Further, the network component may receive a combined hash 144*b* indicative of the transmitted data from a sender. At this stage, the network component may be configured to compare the combined hash 144*a* to the combined hash 144***b* and determine that the decrypted data is authentic if the combined hash 144*a* is equal to the combined hash 144*b*. The network component may be configured to determine that the decrypted data is not authentic if the combined hash 144*a* is not equal to the combined hash 144*b*.

The process 400 starts at operation 402, where the user device 110*a* may be configured to obtain a combined sender hash 144*a*. Then, the process 400 proceeds to operation 440. In this regard, the user device 110*a* may be configured to obtain the combined sender hash 144*a* from a decrypted combined sender hash 146*a* upon executing the one or more ML algorithms 164 in accordance with the one or more ML models. The combined sender hash 146*a* may indicate a combination of the individual hash 146*a* corresponding to shareable data 150 and the individual hash 146*b* corresponding to an encrypted version of the shareable data 150 at the sender (e.g., the server 102).

At operation 412, the user device 110*a* is configured to obtain encrypted version of the shareable data 150. At operation 414, the user device 110*a* may be configured to generate an individual hash 146*c* of an encrypted version of the shareable data 150. Then, the process 400 proceeds to operation 430. At operation 422, the user device 110*a* is configured to obtain the shareable data 150. At operation 424, the user device 110*a* may be configured to generate an individual hash 146*d* of the shareable data 150. Then, the process 400 proceeds to operation 430. In this regard, the user device 110*a* may be configured to obtain a combined receiver hash 144*b* from a decrypted shareable data 150 upon executing the one or more ML algorithms 164 in accordance with the one or more ML models.

At operation 430, the user device 110 may be configured to combine the individual hash 146*c* of encrypted version of the shareable data 150 and the individual hash 146*d* of the shareable data 150. The combined receiver hash 144*b* may be configured to indicate a combination of an individual hash 146*c* corresponding to the shareable data 150 and an individual hash 146*d* corresponding to the encrypted version of the shareable data 150 at a receiver. At operation 440, the user device 110*a* may be configured to compare the combined sender hash 146*a* and the combined receiver hash 146*b*.

The process 400 continues at operation 450, the user device 110*a* is configured to determine whether the combined sender hash 146*a* and the combined receiver hash 146*b* are the same (e.g., at least partially match one another). If the user device 110*a* determines that the combined sender hash 146*a* and the combined receiver hash 146*b* are not the same (e.g., NO), the process 400 proceeds to operation 452 and operation 454. At operation 452, the user device 110*a* determines that the shareable data 150 is not authentic. At operation 454, the user device 110*a* generates a report 162 indicating that the shareable data 150 is not authentic. If the user device 110*a* determines that the combined sender hash 146*a* and the combined receiver hash 146*b* are the same (e.g., YES), the process 400 proceeds to operation 462 and operation 464. At operation 462, the user device 110*a* determines that the shareable data 150 is authentic. At operation 464, the user device 110*a* may be configured to generate a report 162 indicating that the shareable data 150 is authentic.

The process 400 may end at operation 470, where the user device 110*a* may be configured to transmit the report 162 to a sender (e.g., the server 102).

SCOPE OF THE DISCLOSURE

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus, comprising:

a memory configured to store:

one or more machine learning algorithms associated with decrypting data in accordance with one or more machine learning models; and a processor communicatively coupled to the memory and configured to:

receive a first encrypted combined sender hash from a sender, the first encrypted combined sender hash comprising a first combination generated by the sender by combining a first hash generated by the sender from first shareable data and a second hash generated by the sender from an encrypted version of the first shareable data, the encrypted version of the first shareable data being encrypted by the sender;

decrypt the first encrypted combined sender hash to obtain a first combined sender hash upon executing the one or more machine learning algorithms in accordance with the one or more machine learning models;

receive encrypted shareable data from the sender, the encrypted shareable data being encrypted by the sender;

decrypt the encrypted shareable data based at least in part upon one or more keys associated with a receiver upon executing the one or more machine learning algorithms in accordance with the one or more machine learning models;

generate a third hash from the first shareable data obtained from the decrypted encrypted shareable data;

generate a fourth hash from the encrypted version of the first shareable data at the receiver;

combine the third hash and the fourth hash to obtain a first combined receiver hash;

compare the first combined sender hash to the first combined receiver hash;

determine whether the first combined sender hash matches the first combined receiver hash;

in response to determining that the first combined sender hash matches the first combined receiver hash, determine that the first shareable data is authentic;

generate a first report indicating that the first shareable data is authentic; and transmit the first report to the sender of the first combined sender hash.

2. The apparatus of claim 1, wherein the one or more machine learning algorithms are executed in accordance with a machine learning model that is trained based at least in part upon one or more private keys associated with the receiver.

3. The apparatus of claim 1, wherein the first encrypted combined sender hash and the encrypted shareable data are received from a user device communicatively coupled to the sender.

4. The apparatus of claim 1, wherein the first encrypted combined sender hash and the encrypted shareable data are received from the sender.

5. The apparatus of claim 1, wherein the processor is further configured to:

receive a second encrypted combined sender hash from the sender, the second encrypted combined sender hash comprising a third combination generated by the sender by combining a fifth hash generated by the sender from second shareable data and a sixth hash generated by the sender from an encrypted version of the second shareable data, the encrypted version of the second shareable data being encrypted by the sender;

decrypt the second encrypted combined sender hash to obtain a second combined sender hash upon executing the one or more machine learning algorithms in accordance with the one or more machine learning models;

receive second encrypted shareable data from the sender, the second encrypted shareable data being encrypted by the sender;

decrypt the second encrypted shareable data based at least in part upon one or more keys associated with the receiver upon executing the one or more machine learning algorithms in accordance with the one or more machine learning models;

generate a seventh hash from the second shareable data obtained from the decrypted second encrypted shareable data;

generate an eighth hash from the encrypted version of the second shareable data at the receiver;

combine the seventh hash and the eighth hash to obtain a second combined receiver hash;

compare the second combined sender hash to the second combined receiver hash;

determine whether the second combined sender hash matches the second combined receiver hash;

in response to determining that the second combined sender hash matches the second combined receiver hash, determine that the second shareable data is authentic; and generate a second report indicating that the second shareable data is authentic.

6. The apparatus of claim 1, wherein the processor is further configured to:

receive a second encrypted combined sender hash from the sender, the second encrypted combined sender hash comprising a third combination generated by the sender by combining a fifth hash generated by the sender from second shareable data and a sixth hash generated by the sender from an encrypted version of the second shareable data, the encrypted version of the second shareable data being encrypted by the sender;

decrypt the second encrypted combined sender hash to obtain a second combined sender hash upon executing the one or more machine learning algorithms in accordance with the one or more machine learning models;

receive second encrypted shareable data from the sender, the second encrypted shareable data being encrypted by the sender;

decrypt the second encrypted shareable data based at least in part upon one or more keys associated with the receiver upon executing the one or more machine learning algorithms in accordance with the one or more machine learning models;

generate a seventh hash from the second shareable data obtained from the decrypted second encrypted shareable data;

generate an eighth hash from the encrypted version of the second shareable data at the receiver;

combine the seventh hash and the eighth hash to obtain a second combined receiver hash;

compare the second combined sender hash to the second combined receiver hash;

determine whether the second combined sender hash matches the second combined receiver hash;

in response to determining that the second combined sender hash does not match the second combined receiver hash, determine that the second shareable data is not authentic; and generate a second report indicating that the second shareable data is not authentic.

7. A method, comprising:

receiving a first encrypted combined sender hash from a sender, the first encrypted combined sender hash comprising a first combination generated by the sender by combining a first hash generated by the sender from first shareable data and a second hash generated by the sender from an encrypted version of the first shareable data, the encrypted version of the first shareable data being encrypted by the sender;

decrypting the first encrypted combined sender hash to obtain a first combined sender hash upon executing one or more machine learning algorithms in accordance with one or more machine learning models;

receiving encrypted shareable data from the sender, the encrypted shareable data being encrypted by the sender;

decrypting the encrypted shareable data based at least in part upon one or more keys associated with a receiver upon executing the one or more machine learning algorithms in accordance with the one or more machine learning models;

generating a third hash from the first shareable data obtained from the decrypted encrypted shareable data;

generating a fourth hash from the encrypted version of the first shareable data at the receiver;

combining the third hash and the fourth hash to obtain a first combined receiver hash;

comparing the first combined sender hash to the first combined receiver hash;

determining whether the first combined sender hash matches the first combined receiver hash;

in response to determining that the first combined sender hash matches the first combined receiver hash, determining that the first shareable data is authentic;

generating a first report indicating that the first shareable data is authentic; and transmitting the first report to the sender of the first combined sender hash.

8. The method of claim 7, wherein the one or more machine learning algorithms are executed in accordance with a machine learning model that is trained based at least in part upon one or more private keys associated with the receiver.

9. The method of claim 7, wherein the first encrypted combined sender hash and the encrypted shareable data are received from a user device communicatively coupled to the sender.

10. The method of claim 7, wherein the first encrypted combined sender hash and the encrypted shareable data are received from the sender.

11. The method of claim 7, further comprising:

receiving a second encrypted combined sender hash from the sender, the second encrypted combined sender hash comprising a third combination generated by the sender by combining a fifth hash generated by the sender from second shareable data and a sixth hash generated by the sender from an encrypted version of the second shareable data, the encrypted version of the second shareable data being encrypted by the sender;

decrypting the second encrypted combined sender hash to obtain a second combined sender hash upon executing the one or more machine learning algorithms in accordance with the one or more machine learning models;

receiving second encrypted shareable data from the sender, the second encrypted shareable data being encrypted by the sender;

decrypting the second encrypted shareable data based at least in part upon one or more keys associated with the receiver upon executing the one or more machine learning algorithms in accordance with the one or more machine learning models;

generating a seventh hash from the second shareable data obtained from the decrypted second encrypted shareable data;

generating an eighth hash from the encrypted version of the second shareable data at the receiver;

combining the seventh hash and the eighth hash to obtain a second combined receiver hash;

comparing the second combined sender hash to the second combined receiver hash;

determining whether the second combined sender hash matches the second combined receiver hash;

in response to determining that the second combined sender hash matches the second combined receiver hash, determining that the second shareable data is authentic; and generating a second report indicating that the second shareable data is authentic.

12. A non-transitory computer readable medium storing instructions that when executed by a processor cause the processor to:

receive a first encrypted combined sender hash from a sender, the first encrypted combined sender hash comprising a first combination generated by the sender by combining a first hash generated by the sender from first shareable data and a second hash generated by the sender from an encrypted version of the first shareable data, the encrypted version of the first shareable data being encrypted by the sender;

decrypt the first encrypted combined sender hash to obtain a first combined sender hash upon executing one or more machine learning algorithms in accordance with one or more machine learning models;

receive encrypted shareable data from the sender, the encrypted shareable data being encrypted by the sender;

decrypt the encrypted shareable data based at least in part upon one or more keys associated with a receiver upon executing the one or more machine learning algorithms in accordance with the one or more machine learning models;

generate a third hash from the first shareable data obtained from the decrypted encrypted shareable data;

generate a fourth hash from the encrypted version of the first shareable data at the receiver;

combine the third hash and the fourth hash to obtain a first combined receiver hash;

compare the first combined sender hash to the first combined receiver hash;

determine whether the first combined sender hash matches the first combined receiver hash;

in response to determining that the first combined sender hash matches the first combined receiver hash, determine that the first shareable data is authentic;

generate a first report indicating that the first shareable data is authentic; and transmit the first report to the sender of the first combined sender hash.

13. The non-transitory computer readable medium of claim 12, wherein the one or more machine learning algorithms are executed in accordance with a machine learning model that is trained based at least in part upon one or more private keys associated with the receiver.

14. The non-transitory computer readable medium of claim 12, wherein the first encrypted combined sender hash and the encrypted shareable data are received from a user device communicatively coupled to the sender.

* * * * *